US012695744B2

(12) United States Patent
Trinelli et al.

(10) Patent No.: US 12,695,744 B2
(45) Date of Patent: Jul. 28, 2026

(54) SELECTIVE AUTHORIZATION CONTROL IN MULTI-TENANT APPLICATIONS

(71) Applicant: Cisco Technology, Inc., San Jose, CA (US)

(72) Inventors: Marco Trinelli, Lausanne (CH); Frank Brockners, Cologne (DE); Jean Andrei Diaconu, Gaillard (FR); Marcelo Yannuzzi, Nuvilly (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/791,249

(22) Filed: Jul. 31, 2024

(65) Prior Publication Data

US 2026/0039647 A1 Feb. 5, 2026

(51) Int. Cl.
H04L 29/00 (2006.01)
H04L 9/40 (2022.01)
(52) U.S. Cl.
CPC ................................... H04L 63/083 (2013.01)
(58) Field of Classification Search
CPC ........................... H04L 63/083; H04L 63/0807
See application file for complete search history.

(56) References Cited

U.S. PATENT DOCUMENTS

| | | | | |
|---|---|---|---|---|
| 8,190,757 | B1 * | 5/2012 | Davis | G06F 9/468 |
| | | | | 709/225 |
| 9,047,469 | B2 * | 6/2015 | Olson | G06F 21/6218 |

| | | | | |
|---|---|---|---|---|
| 9,660,989 | B1 * | 5/2017 | Fredinburg | G06F 21/41 |
| 9,942,211 | B1 * | 4/2018 | Campagna | H04L 63/062 |
| 10,482,231 | B1 * | 11/2019 | Harding | G06F 21/335 |
| 10,608,997 | B1 * | 3/2020 | Sethi | H04L 63/123 |
| 10,698,704 | B1 * | 6/2020 | Patel | G06Q 30/0641 |
| 10,853,531 | B2 * | 12/2020 | Li | G06F 30/20 |
| 11,290,561 | B2 * | 3/2022 | Shim | H04W 12/12 |
| 11,397,794 | B1 * | 7/2022 | Baghani | G06F 21/44 |
| 11,468,425 | B1 * | 10/2022 | Suthar | G06Q 20/24 |

(Continued)

FOREIGN PATENT DOCUMENTS

WO         2022126266  A1      6/2022

OTHER PUBLICATIONS

CISCO: "Cisco Identity Services Engine (ISE)", retrieved from https://www.cisco.com/site/us/en/products/security/identity-services-engine/index.html on May 21, 2024, 5 Pages.

(Continued)

*Primary Examiner* — Don G Zhao

(74) *Attorney, Agent, or Firm* — Merchant & Gould P.C.; Kenneth J. Heywood

(57) ABSTRACT

In one implementation, a device may obtain a request from a client of an application to utilize a backend widget. The device may determine, based on an identifier of the application and a token associated with the request, whether a user associated with the request is authorized to utilize the backend widget. The device may determine, based on the identifier of the application and an identifier of the client associated with the request, whether the application is authorized to utilize the backend widget. The device may modify, responsive to a determination that the user and the application are authorized to utilize the backend widget, the request to include context for the application to utilize the backend widget.

20 Claims, 10 Drawing Sheets

(56) References Cited

U.S. PATENT DOCUMENTS

| | | | | |
|---|---|---|---|---|
| 11,644,955 | B1 * | 5/2023 | Singamneni | G06F 3/0481 |
| | | | | 707/722 |
| 11,861,409 | B2 * | 1/2024 | Cook | G06F 9/505 |
| 12,056,255 | B1 * | 8/2024 | Mystetskyi | G06F 9/445 |
| 12,118,343 | B2 * | 10/2024 | Featherstone | H04L 67/51 |
| 12,153,655 | B2 * | 11/2024 | Blachman | G06F 9/451 |
| 12,164,652 | B1 * | 12/2024 | Li | G06F 21/6218 |
| 12,438,883 | B2 * | 10/2025 | Venkatesan | H04L 63/20 |
| 2006/0003765 | A1 * | 1/2006 | Patil | H04W 8/12 |
| | | | | 455/411 |
| 2010/0235754 | A1 * | 9/2010 | Leitheiser | G06F 16/9535 |
| | | | | 715/733 |
| 2011/0116629 | A1 * | 5/2011 | Forsberg | H04L 63/062 |
| | | | | 380/44 |
| 2011/0202988 | A1 * | 8/2011 | Otranen | H04L 9/3213 |
| | | | | 726/8 |
| 2013/0347070 | A1 * | 12/2013 | Cairns | H04W 4/60 |
| | | | | 726/3 |
| 2014/0095382 | A1 | 4/2014 | Desai et al. | |
| 2014/0351915 | A1 * | 11/2014 | Otranen | H04L 63/0815 |
| | | | | 726/8 |
| 2015/0067813 | A1 | 3/2015 | Cha et al. | |
| 2015/0142982 | A1 * | 5/2015 | Gonzales | H04L 65/1069 |
| | | | | 709/227 |
| 2015/0302398 | A1 * | 10/2015 | Desai | G06Q 20/322 |
| | | | | 705/41 |
| 2016/0180080 | A1 * | 6/2016 | Heldt-Sheller | H04L 63/145 |
| | | | | 726/22 |
| 2017/0331812 | A1 * | 11/2017 | Lander | H04L 63/0815 |
| 2018/0041491 | A1 * | 2/2018 | Gupta | G06F 9/547 |
| 2018/0081905 | A1 * | 3/2018 | Kamath | G06F 16/287 |
| 2019/0141046 | A1 | 5/2019 | Cairns et al. | |
| 2019/0238598 | A1 * | 8/2019 | Mohamad Abdul | |
| | | | | H04L 63/0807 |
| 2019/0253431 | A1 * | 8/2019 | Atanda | G06F 21/62 |
| 2020/0106763 | A1 * | 4/2020 | Pancholi | H04L 9/3213 |
| 2020/0387388 | A1 * | 12/2020 | Patel | G06Q 30/0641 |
| 2021/0081252 | A1 * | 3/2021 | Bhargava | H04L 67/1019 |
| 2021/0168147 | A1 * | 6/2021 | Gupta | H04L 63/1425 |
| 2021/0294619 | A1 * | 9/2021 | Patel | G06F 16/955 |
| 2022/0353298 | A1 * | 11/2022 | Shiffer | H04L 63/10 |
| 2023/0053805 | A1 * | 2/2023 | Kim | H04L 67/63 |
| 2023/0110527 | A1 | 4/2023 | Bhat et al. | |
| 2023/0388311 | A1 * | 11/2023 | Kishimoto | H04L 63/102 |
| 2024/0114035 | A1 * | 4/2024 | Rungta | H04L 63/102 |
| 2024/0179140 | A1 * | 5/2024 | Little | H04L 63/10 |
| 2024/0202545 | A1 * | 6/2024 | Lotz | G06N 5/04 |
| 2024/0248732 | A1 * | 7/2024 | Patel | G06Q 30/0641 |
| 2024/0330445 | A1 * | 10/2024 | Shavit | G06F 21/562 |
| 2024/0330709 | A1 * | 10/2024 | David | G06F 9/468 |
| 2024/0396732 | A1 * | 11/2024 | Bok | H04L 9/3297 |
| 2025/0030690 | A1 * | 1/2025 | Jolfaei | H04L 63/0846 |
| 2025/0080416 | A1 * | 3/2025 | Mitrache | H04L 41/16 |
| 2025/0193009 | A1 * | 6/2025 | Hatchue | G06F 21/6218 |
| 2025/0193185 | A1 * | 6/2025 | Hatchue | H04L 63/0281 |
| 2025/0226985 | A1 * | 7/2025 | Lind | H04L 9/3228 |

OTHER PUBLICATIONS

CISCO: "Security Group Tags", retrieved from https://edge.staging.cdo.cisco.com/content/docs/c-troubleshoot-ftd-executive-summary-report.html#!c_ftd-security-group-tags_2.html accessed on May 21, 2024, 3 Pages.

GITHUB: "Managing a MySQL for RDS Database in a Private VPC", awsdocs, retrieved from https://github.com/awsdocs/aws-lambda-developer-guide/tree/main/sample-apps/rds-mysql on May 21, 2024, 7 Pages.

Open Policy Agent: "Policy-based Control for Cloud Native Environments", retrieved from https://www.openpolicyagent.org/ on May 21, 2024, 6 Pages.

* cited by examiner

DATABASES 106

SERVERS 104

NETWORK(S) 110

140

CLIENT N 102

CLIENT 1 102

DEVICE 200

MEMORY 240

OPERATING SYSTEM 242

FUNCTIONAL PROCESS 246

AUTHORIZATION PROCESS 248

DATA STRUCTURES 245

SYSTEM BUS 250

PROCESSOR(S) 220

POWER SUPPLY 260

INPUT/OUTPUT INTERFACE(S) 230

NETWORK INTERFACE(S) 210

Widget High Level Diagram

Widget Creation

Widget Creation

SELECTIVE AUTHORIZATION CONTROL IN MULTI-TENANT APPLICATIONS

TECHNICAL FIELD

The present disclosure relates generally to computer networks and more particularly to selective authorization control in multi-tenant applications.

BACKGROUND

Generic helper functions such as application widgets, software plug-ins, Kubernetes (K8s) operators, and the like, are prevalently deployed across different industries today. Despite their widespread use, facilitating the controlled access and utilization of these helper functions exclusively within authorized products remains a complex issue. This complexity is often addressed through the implementation of proprietary protocols or custom authorization mechanisms that only work with selected technologies, products, or services.

Additionally, the scenario becomes increasingly intricate within multi-tenant applications deployed on cloud-based platforms. Helper functions or widgets often require the capability to act on behalf of a tenant to access resources. However, these widgets commonly lack intrinsic knowledge of the tenant context they are operating within, and for security reasons, should not possess this information. This results in a challenge where the cloud service must ascertain the appropriate tenant context for the widget's actions without direct instruction from the widget itself.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device may obtain a request from a client of an application to utilize a backend widget. The device may determine, based on an identifier of the application and a token associated with the request, whether a user associated with the request is authorized to utilize the backend widget. The device may determine, based on the identifier of the application and an identifier of the client associated with the request, whether the application is authorized to utilize the backend widget. The device may modify, responsive to a determination that the user and the application are authorized to utilize the backend widget, the request to include context for the application to utilize the backend widget.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
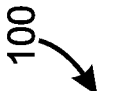
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as authorization process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, authorization process 248 may include computer executable instructions that, when executed by processor 220, cause device 200 to perform the techniques described herein. To do so, in some implementations, authorization process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, authorization process 248 may employ and/or be utilized to handle prompts to and/or access of one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that authorization process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, authorization process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, authorization process 248 may be a component of, use, and/or be utilized in the management of prompts/access to a generative model to generate configurations or other outputs based on a conversational input from a user (e.g., voice, text, etc.). In another example, authorization process 248 may utilize a generative model with a method invocation data collector (MIDC) to assist in automated or manual identification of transactional attributes for spans. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
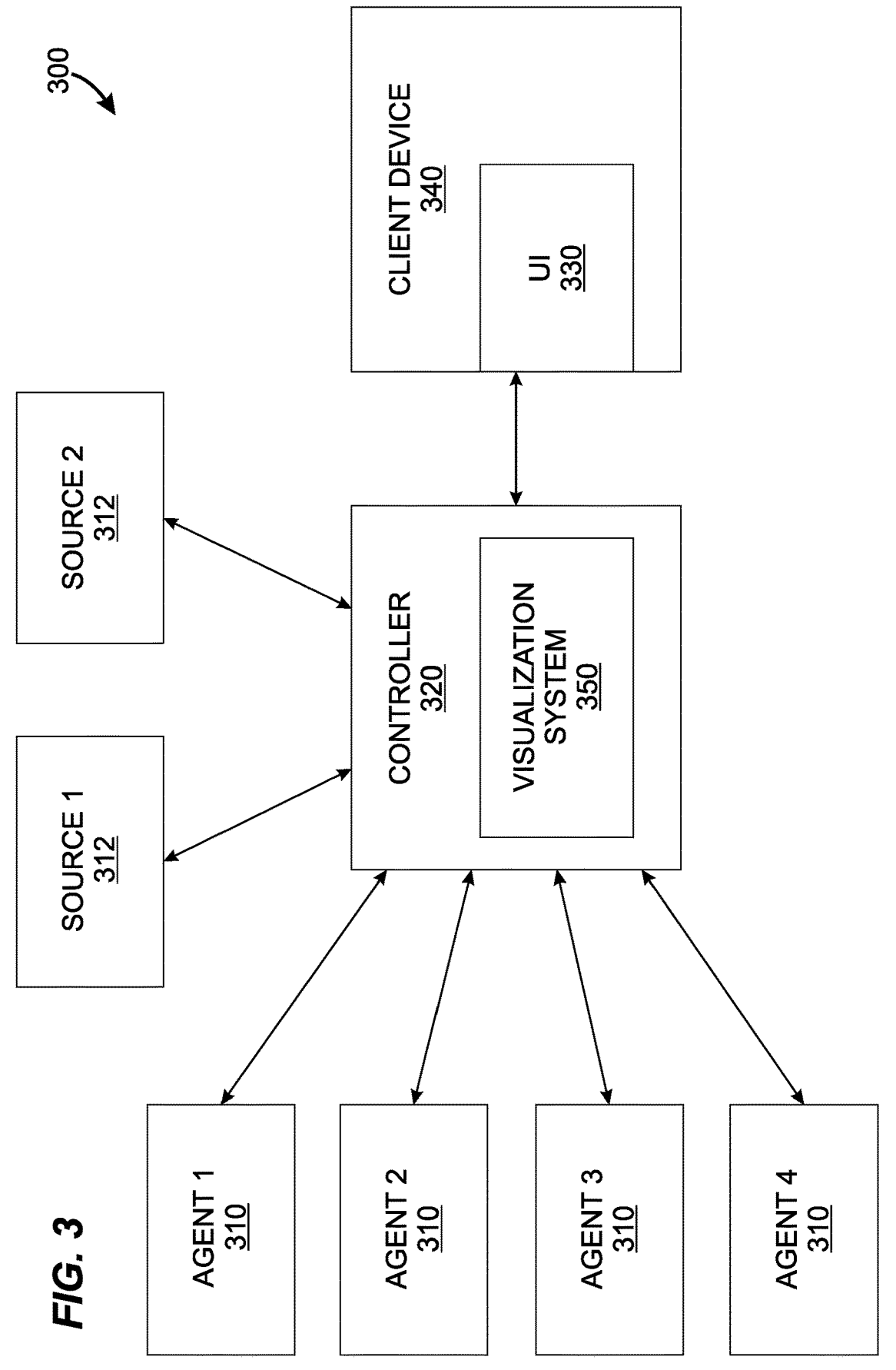
FIG. 3 illustrates an example observability intelligence platform.

FIG. 3 is a block diagram of an example of an observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, generic helper functions, such as application widgets, software plugins, and Kubernetes (K8) operators, are widely used across various industries. Despite their widespread adoption, controlling access and ensuring the secure utilization of these widgets exclusively within authorized products remains a complex challenge. Existing solutions often rely on proprietary protocols or custom authorization mechanisms, which are limited to specific technologies, products, or services.

These approaches introduce several deficiencies. For example, proprietary protocols lack interoperability, resulting in siloed systems that cannot easily integrate with diverse applications and platforms. This limits the scalability and flexibility of the widgets. Secondly, custom authorization mechanisms are often bespoke, requiring significant development and maintenance efforts. They are not easily adaptable to changing security requirements or expanding functionalities, leading to increased costs and slower innovation cycles.

Additionally in the context of multi-tenant applications deployed on cloud-based platforms, the situation becomes even more intricate. Widgets in such environments often need to act on behalf of tenants to access resources. However, these widgets generally lack intrinsic knowledge of the tenant context they operate within and, for security reasons, should not possess this information. This gap necessitates a robust mechanism for the cloud service to ascertain in the appropriate tenant context for each widget action without direct instruction from the widget itself.

The absence of such mechanisms leads to significant security risks and operational inefficiencies. For example, without proper context management, a widget may inadvertently access data belonging to another tenant, causing data breaches and violating privacy regulations. Furthermore, the lack of dynamic context association results in cumbersome manual configurations, increasing the risk of errors and reducing the overall agility of the system.

Selective Authorization Control in Multi-Tenant Applications

In contrast, the techniques described herein introduced a more robust and flexible solution that can dynamically manage tenant contexts and ensure secure, context-aware widget operations across multi-tenant environments. These techniques integrate seamlessly with authorization protocols while providing an additional layer of fine-grained access control. These techniques may facilitate a generic helper function (e.g., widget) being used by different applications. Based on pre-authorization (e.g., following a business relationship), the helper function may be authorized for use only with a specific set of applications, instead of being used generically with all applications where it would be technically possible. Owners may leverage these techniques to decide whether a helper function is authorized to be used within a specific application and, in case of multi-tenant Applications, which tenant to be used.

Illustratively, the techniques described herein may be performed by hardware, software, and/or firmware, such as in accordance with authorization process 248, which may include computer executable instructions executed by the processor 220 (or independent processor of interfaces 210) to perform functions relating to the techniques described herein.

Specifically, according to various implementations, a device may obtain a request from a client of an application to utilize a backend widget. The device may determine, based on an identifier of the application and a token associated with the request, whether a user associated with the request is authorized to utilize the backend widget. The device may determine, based on the identifier of the application and an identifier of the client associated with the request, whether the application is authorized to utilize the backend widget. The device may modify, responsive to a determination that the user and the application are authorized to utilize the backend widget, the request to include context for the application to utilize the backend widget.

Figure 4:
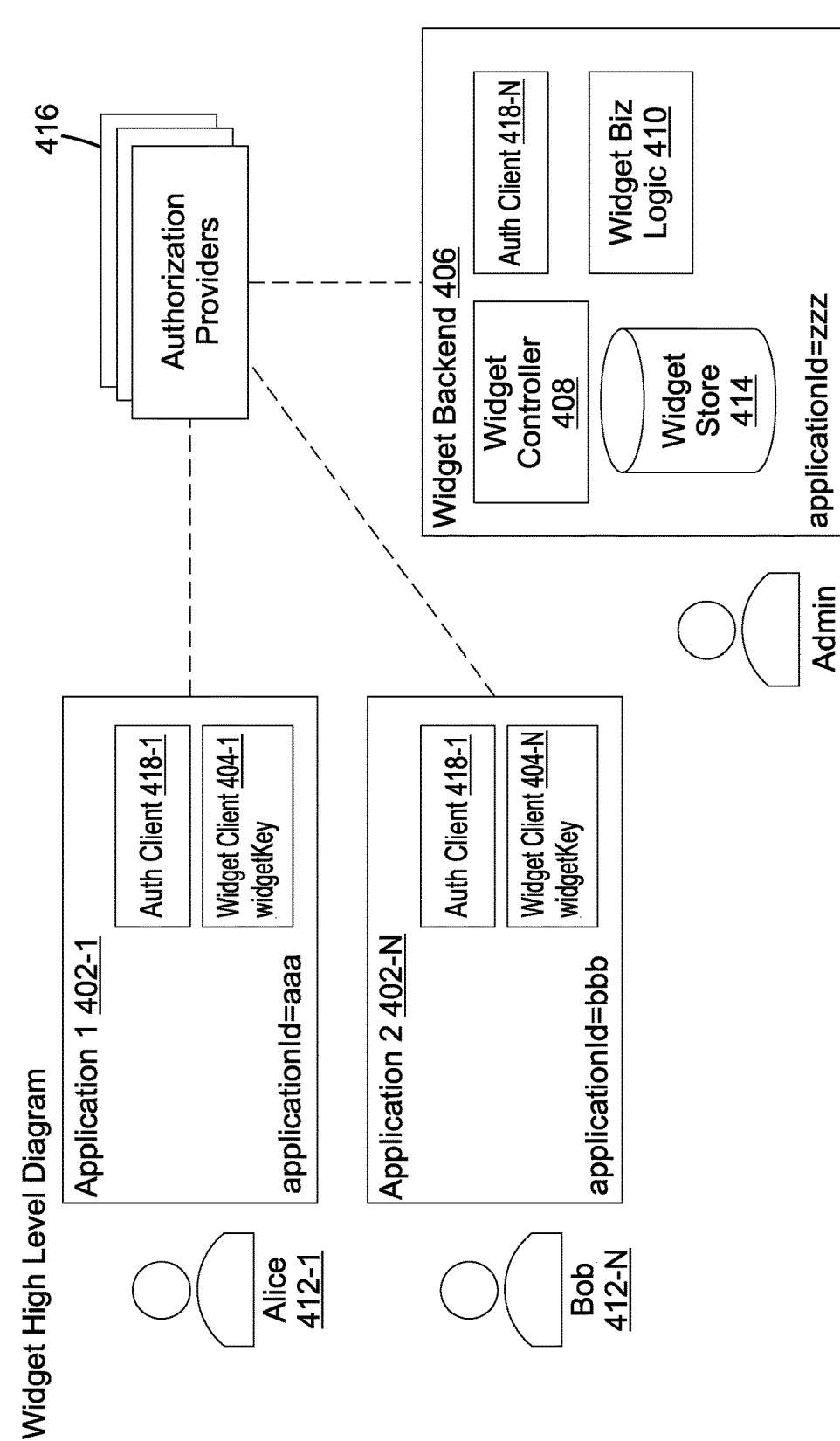
FIG. 4 illustrates an example of an architecture for selective authorization control in multi-tenant applications.

Operationally, FIG. 4 illustrates an example of an architecture 400 for selective authorization control in multi-tenant applications. Architecture 400 may include applications 402 (e.g., 402-1 . . . 402-N). An application may be a product and/or computer program (e.g., a tangible, non-transitory, computer-readable medium storing program instructions that cause a device to execute a process) which carries out specific tasks to support the needs of a user. An application may consist of business logic and code that can be implemented in a distributed way (e.g., micro-service application with a front-end and a distributed, micro-services-based backend). To fulfil its tasks, the application may leverage functionality which is provided by one or more widgets.

Architecture 400 may include widgets comprising constituent components operable as a small application, helper-function, and/or component that enables the user to perform a task or access a service. Here, the example widget consists of two components: widget clients 404 (e.g., 404-1 . . .

404-N) which may integrate with the user-facing application/product (e.g., applications 402) and a widget backend 406 which may implement additional business logic and/or which is typically run in the (public/private) cloud.

Widget clients 404 may provide for authorized access to the widget backend 406 and/or the business logic provided by the widget backend 406. The widget backend 406 may handle authorization for a client and/or may comprise a widget controller 408 and/or widget business logic 410. The widget backend 406 may implement the functionality provided by the widget. The widget backend 406 may be independent from the applications 402 and/or the users 412 (e.g., 412-1 . . . 412-N) of the applications 402.

The widget controller 408 may include a service within the widget backend 406 that handles multi-tenancy and invokes different business logic based on the type of the request. In addition, widget backend 406 may include and/or be communicatively coupled to a widget store 414. Widget store 414 may include a persistent storage to store a unique identifier for the widget (e.g., the widgetKey) and/or associated information (such as applicationId, tenantId, properties, etc.). The widget business logic 410 may include the functionality provided by the widget (e.g., machine readable instructions executable by a processor, configurations and metadata, integration points, data management structures, security mechanisms, UI integrations, etc. needed to define and execute the widgets specific functionalities).

Architecture 400 may also include authorization providers 416. The authorization providers 416 may be services, systems, etc. responsible for managing user identities, authenticating users, issuing tokens that gran access to various resources, etc. The authorization providers 416 may enforce security policies, ensuring that only authorized users can perform specific actions within the application and/or widget system.

In addition, architecture 400 may include authorization clients 418 (418-1 . . . 418-N). Authorization clients 418 may include application-end authorization clients (e.g., 418-1 and 418-2) that facilitate the authentication and authorization process for users 412 accessing the applications 402. This client may interact with one or more of the authorization providers 416 to authenticate users, obtain tokens, manage user sessions, etc. Further, it may ensure secure access control by using these tokens to authorize users' actions within an application.

Authorization clients 418 may additionally include application-end authorization clients (e.g., 418-N) that is responsible for interfacing with one or more of the authorization providers 416 to authenticate and/or authorize widget-specific actions. This client may verify tokens, manage authenticated sessions, enforce permissions for widget operations, etc. Further, it may ensure that widget actions are performed securely and in accordance with the permissions granted to the users 412 and/or the applications 402.

Architecture 400 may be configured to leverage authorization protocols (e.g., OIDC, OAuth2, SSO, etc.) in a third-party application (e.g., applications 402), as a first-level authorization performed by an authorization client (e.g., authorization clients 418), to validate access between a user and the widgets. Further, architecture 400 may be configured to provide a second-level authorization, performed by the widget controller 408, that enforces the usage of the widget only for a specific set of applications.

Architecture 400 may support multi-tenancy deployments wherever, independently, and/or transparently to the third-party application that is using the widget. Architecture 400 may be utilized to target the application's required context about tenancy in order to access tenant-specific resources.

For example, two third-party applications (e.g., applications 402) may integrate the widget (e.g., widget client) and an authorization client which they use to authenticate and authorize a user utilizing the application. As described above, the widget backend 406 may include the widget controller 408 and/or a widget store 414 and may run the widget business logic 410.

Each of the applications 402, as well as the widget backend 406, may be linked to one or more of the authorization providers 416 and may be configured with a specific application identifier (e.g., applicationId). The applicationId may be a universally unique identifier (UUID) that is generated by an authorization provider and/or granted to one or more of the applications 402 belonging to the same product. In OIDC/OAuth2 terminology, the applicationId can be mapped to the OAuth2 clientId. Some authorization proxies could generate and manage such applicationIds, using OAuth2 underneath.

Figure 5:
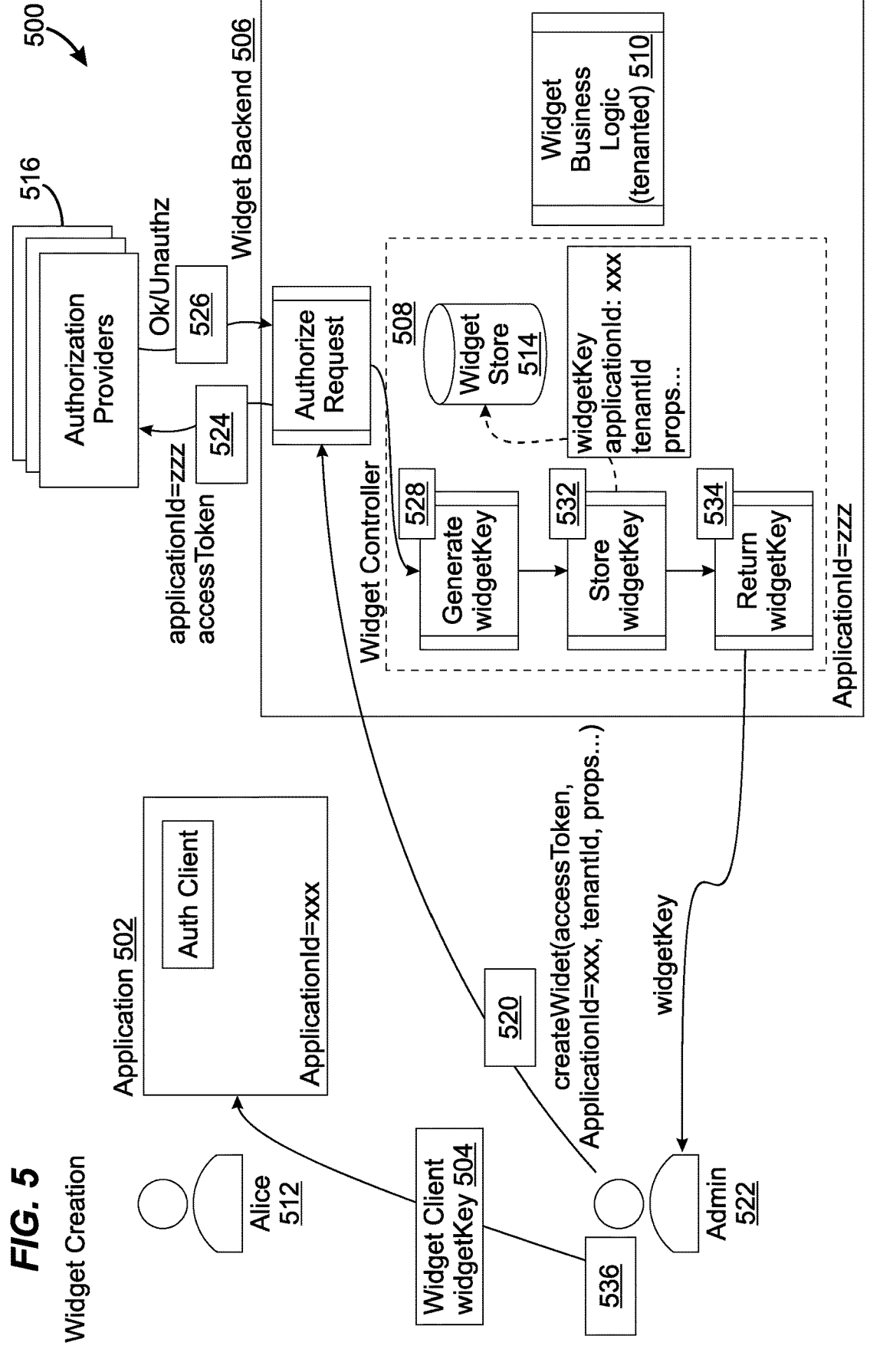
FIG. 5 illustrates an example of an architecture for widget creation with selective authorization control in multi-tenant applications.

FIG. 5 illustrates an example of an architecture 500 for widget creation with selective authorization control in multi-tenant applications. In this non-limiting example, the widget in question may be an application of a cloud-based, multi-tenant service designed to facilitate and expedite the integration process with third-party products. This architecture 500 may facilitate a service in providing the capability for third parties to embed a ready-to-use widget into their product offerings. Hence, the widget may enable third-party applications to interface with the service's API in a seamless manner. The widget may be a pre-packaged UI component, eliminating the need to implement a new UI component from scratch to interact with the service's API.

An administrator 522 of the widget backend 506 may be in charge of creating the widget, so as to be used and integrated in a third-party application. The widget backend 506 may support multi-tenancy, meaning that the same instance of the widget backend 506 can be used by different third-party applications.

In a non-limiting widget creation scenario, an administrator 522 may, at box 520, submit a request to integrate a widget into an application 502. The administrator 522 may specify the application 502 (e.g., by applicationId) on which the widget will be installed. The administrator 522 may also specify the tenant (e.g., by tenantId) used to access tenant-specific resources (e.g., widget business logic 510) in the widget backend 506. Further, the administrator 522 may specify eventual other properties that could be useful for functional or business purposes.

At box 524, an authorization operation may be performed on the request (e.g., leveraging one or more of the authorization providers 516). For example, an attempt to authorize the request may be attempted using the applicationId of the widget backend 506. If the authorization operation is successful, then, at box 526, control may be passed to the widget controller 508. The widget controller 508, which could be deployed as a module part of the widget backend 506, or a as separate service, may receive the administrator's request (authorized) and, at box 528, generate a unique key (e.g., the widget key).

The widget controller 508 may, at box 532, save the auto-generated widget key and/or any linked information (e.g., applicationId, tenantId, properties, etc.) to the widget store 514 (e.g., a persistent storage). At box 534, the widget controller 508 may return the widget key to the administrator 522. The administrator 522 may, at box 536, configure the widget with the widget key (e.g., widget client 504 configured with widget key) and/or pass it to the user 512 and/or application 502.

Figure 6:
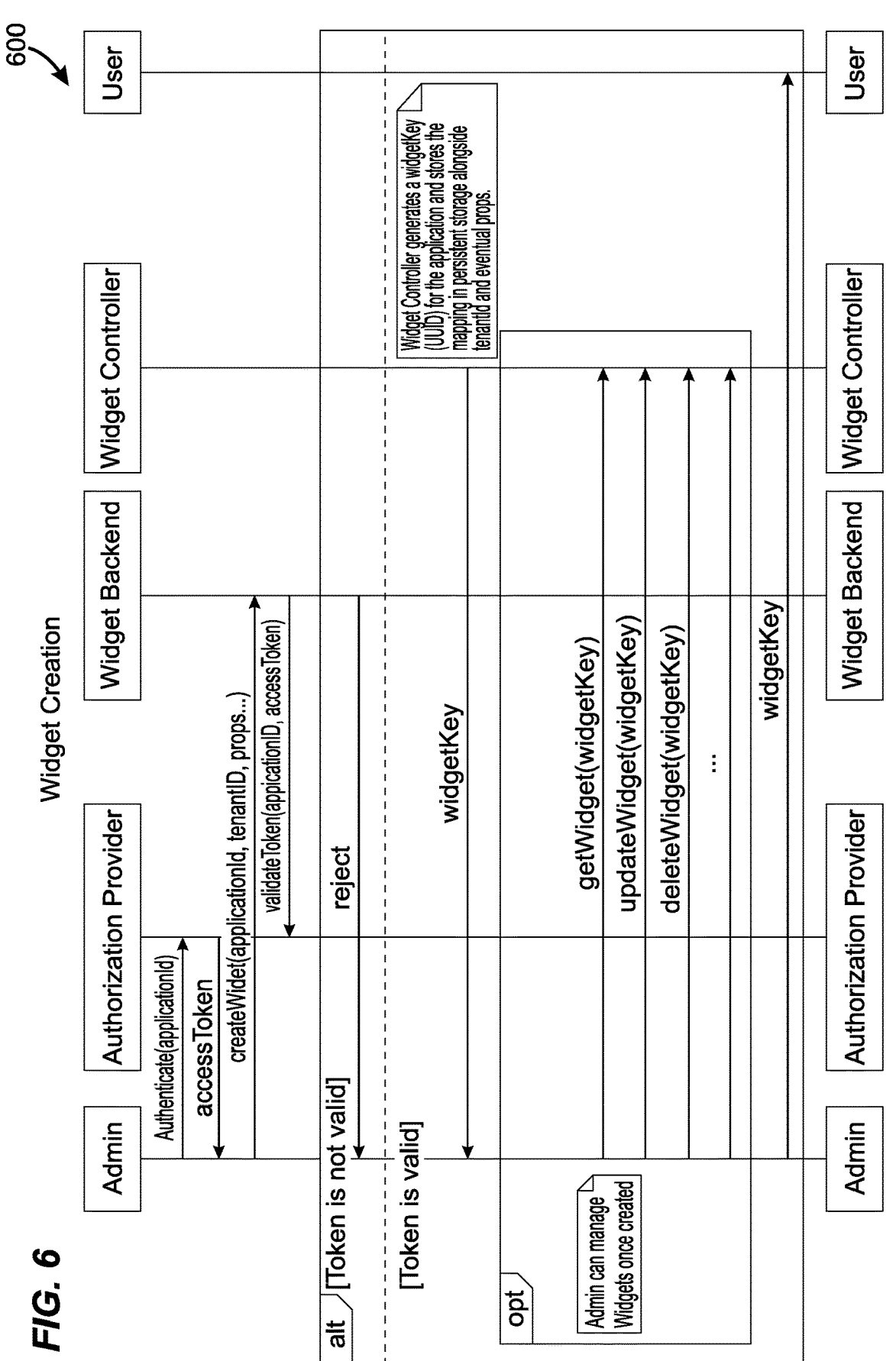
FIG. 6 illustrates an example of a sequence diagram for a widget creation scenario with selective authorization control in multi-tenant applications.

FIG. 6 illustrates an example of a sequence diagram 600 for a widget creation scenario with selective authorization control in multi-tenant applications. Sequence diagram 600 illustrates the authentication attempt by the administrator with the authorization provider. When successful, the authorization provider returns an access token and the administrator proceeds to submit a request to create the widget (e.g., defining applicaitonId, tenantId, properties, etc.). The widget backend may then attempt to validate the token (e.g., applicaitonId, access token).

If the token is not valid, then the widget backend may reject the request. Alternatively, if the token is valid, then the request may be authorized and the widget controller may generate a widget key (e.g., UUID) for the application and store the mapping in persistent storage alongside a corresponding tenantID and eventual properties. The widget controller may provide the widget key to the administrator for configuration of the widget.

Ultimately, the administrator may provide the widget key (e.g., alone, as part of a configuration of a widget client, etc.) to a user and/or application. In some instances, the administrator can manage the widgets once created. For example, the administrator may get a widget, update a widget, delete a widget, etc. utilizing the widget key identifier.

Figure 7:
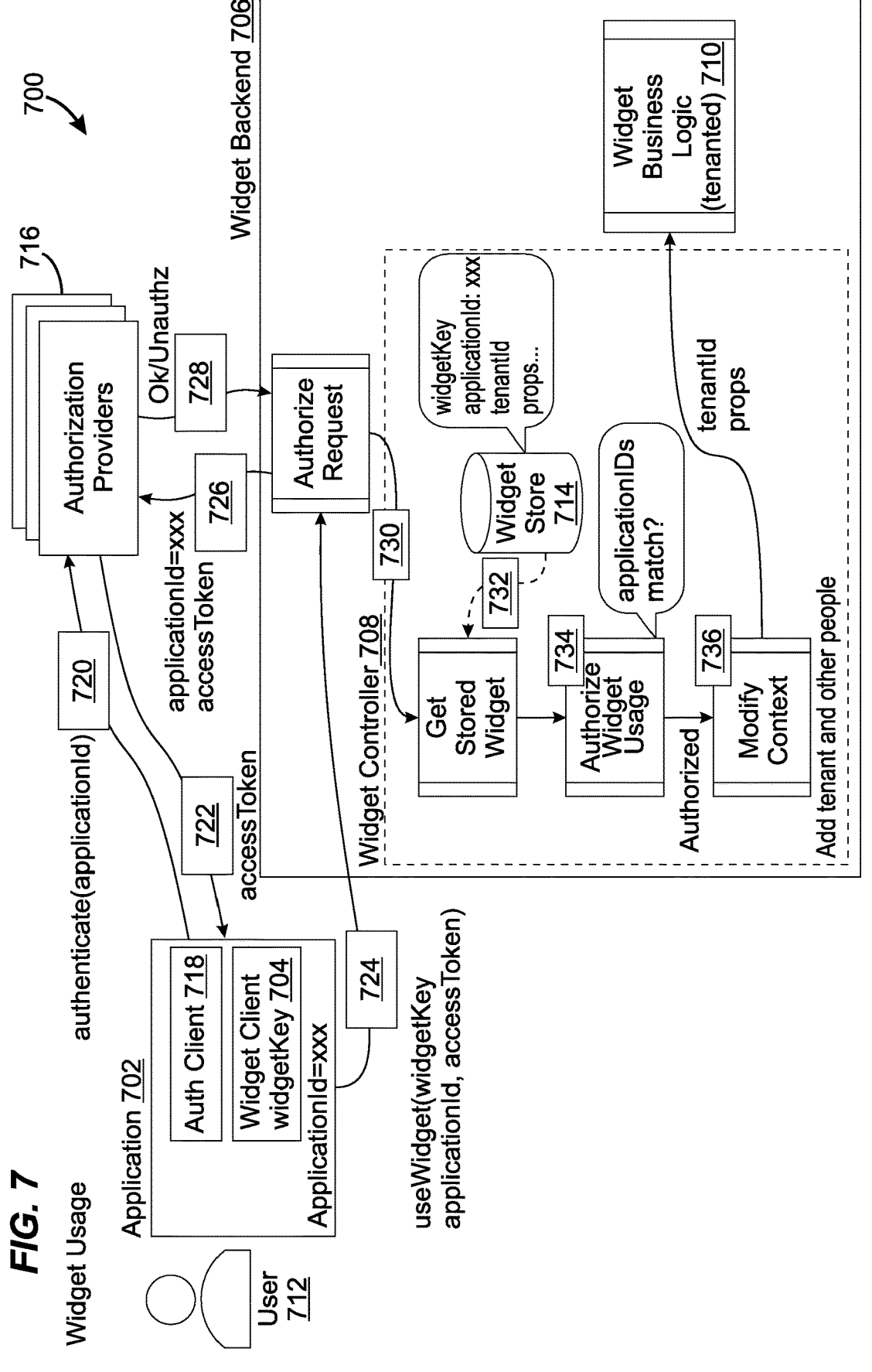
FIG. 7 illustrates an example of an architecture for widget utilization with selective authorization control in multi-tenant applications.

FIG. 7 illustrates an example of an architecture 700 for widget utilization with selective authorization control in multi-tenant applications. Here, the application 702 (e.g., third-party application) includes an authentication client 718, which may be in charge of authenticating a user's (e.g., user 712) session with the widget backend 706, and the application widget (e.g., widget client 704). The authentication client 718 may utilize authentication protocols (e.g., OIDC, OAuth2, etc.). The widget may be configured with a widget key, and the application 702 may be bound to a specific applicaitonId.

At box 720, the application 702 may attempt to authenticate the user's session for a specific applicationId. The authorization may be performed by communication with an authorization provider 716. Upon successful authentication, the user 712 may, at box 722, be granted a token, such as an access token, from the authorization provider 716 to access a service like the widget backend 706.

At box 724, user 712 may make use of the widget (e.g., invoking a language model (e.g., LLM) prompt) via the widget client 704, and provide the widget key, its applicationId, and/or the access token to widget backend 706. The request may be received by the widget backend 706, which first checks if it's authorized. This first level of authorization may be utilized to validate if the user 712 is authorized to access the application services.

To do so, the widget backend 706 may use the received applicationId and the access token for this first-level authorization with authorization provider 716. If authorized (e.g., at box 728), the access token for the applicationId may be validated and control may be passed to the widget controller 708. At box 730, the widget controller 708 receives the widget key and/or applicationId (validated after box 728) from the user's request. At box 732, the widget controller 708 retrieves the stored widget information from persistent storage (e.g., widget store 714).

At box 734, the widget controller 708 may authorize widget usage upon confirming that widget key and applicationId match. This second-level authorization may be utilized to validate that the widget can be used by the application 702. In various implementations, the widget controller 708 may utilize third-party policies servers, such as open policy agent (OPA), cisco identity services engine (ISE), etc. to perform more fine-grained access control, also based on the additional properties included during widget creation time. Finally, at box 736, the widget controller 708 modifies the context to add tenancy information and/or other properties needed for the widget business logic 710.

Figure 8A:
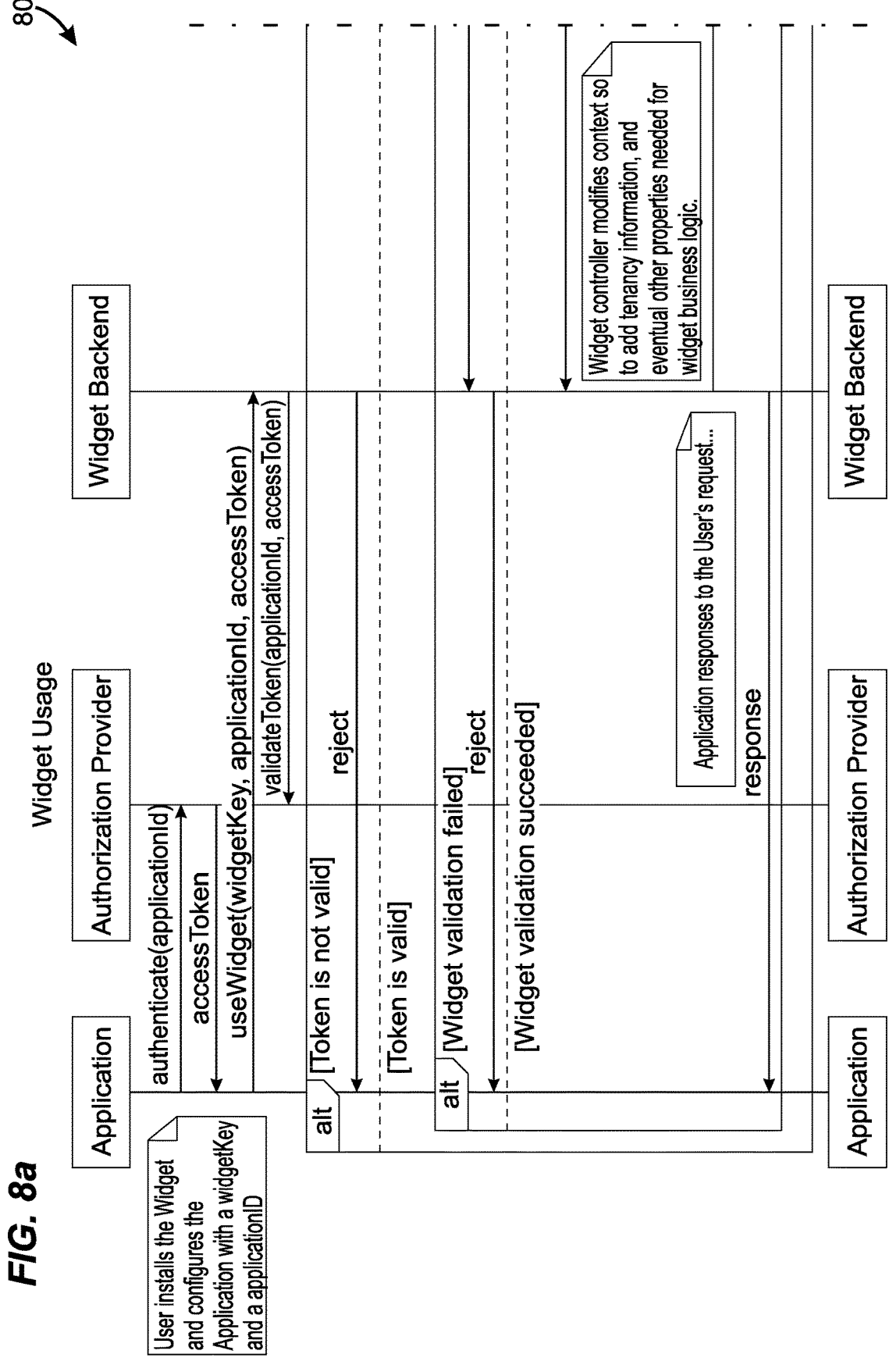
FIGS. 8A-8B illustrate an example of a sequence diagram for a widget utilization scenario with selective authorization control in multi-tenant applications.
Figure 8B:
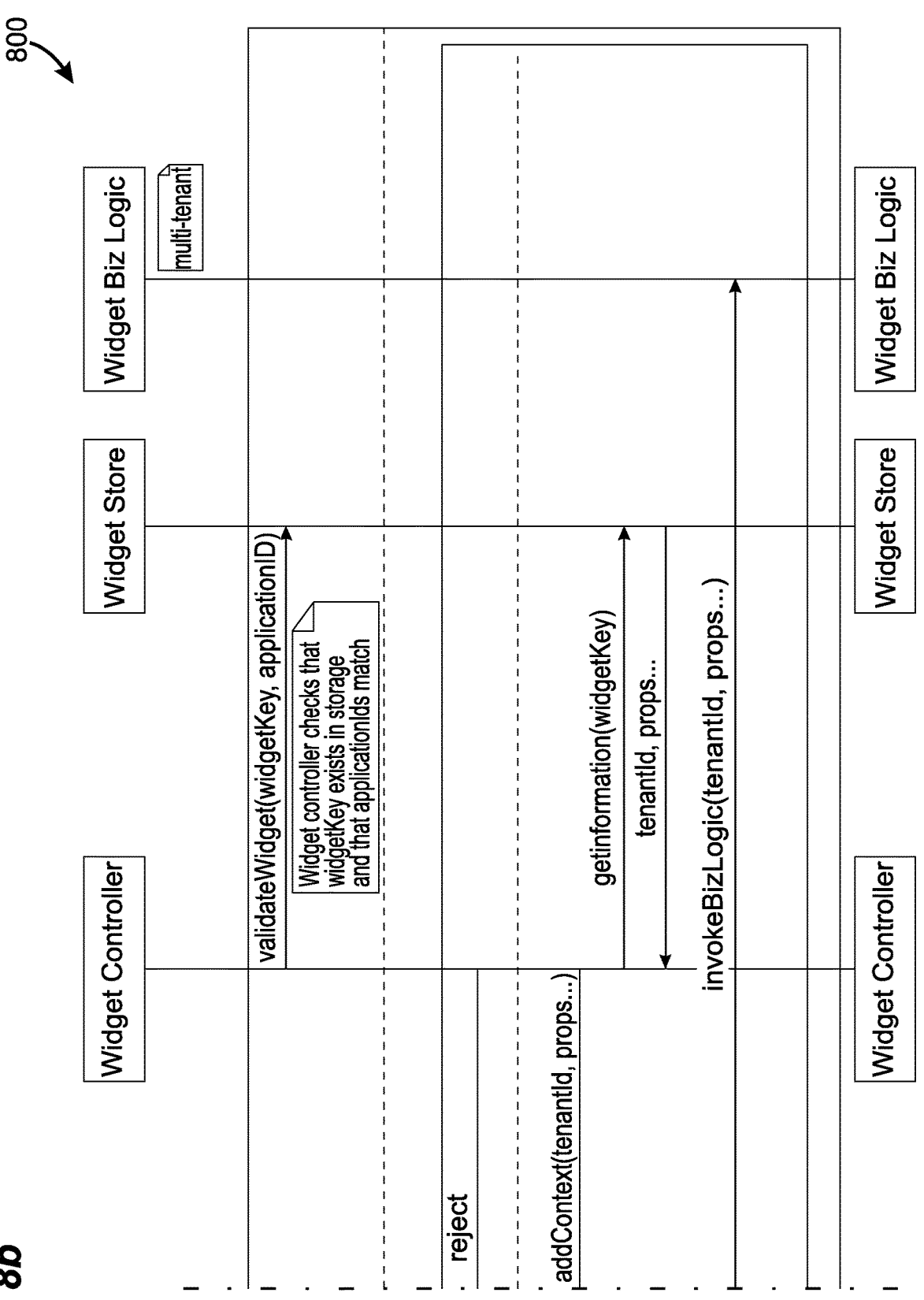

FIGS. 8A-8B illustrate an example of a sequence diagram 800 for a widget utilization scenario with selective authorization control in multi-tenant applications. Sequence diagram 800 illustrates the application attempting to authenticate with the authorization provider. Upon successful authentication, authorization provider provides an access token to the application. Application may attempt to utilize the widget client and provide the widget key, applicationId, and/or access token to the widget backend.

The widget backend may validate the token. If the token is not valid, reject the request to utilize the widget. If the token is valid, then the widget controller may perform a widget validation. For example, the widget controller may check that the widget key exists in storage and that the applicationID matches. If the widget validation fails, then a rejection may be communicated to the widget backend and/or the application. If the widget validation is successful, then the widget controller may get the stored widget information from the widget store and add context. The widget backend may invoke the business logic and respond to a user's request.

These techniques may facilitate a first and second level authorization process. The second level authorization performed by the widget controller may grant a widget access only to selected applications. In addition, these techniques introduce a context-augmentation mechanism that may be performed by the widget controller. The context-augmentation may manage the permissions of third-party applications to execute tenanted business logic of an application in a secure way.

Example deployment scenarios are outlined below. It should be understood that these scenarios are intended as reference implementations of more broadly applicable operational mechanisms outlined herein. That is, the broader concepts, while outlined in the context of particular scenarios, are not confined to these scenarios and are broadly applicable across various implementations of selective authorization control in multi-tenant applications.

In an example scenario involving UI component use across different products, a common UI widget (e.g., language model (LLM)-powered AI chatbot) is used across different UI frontends. The widget may be a npm library which can be configured with a specific widget Key. The frontend may be configured with a specific applicationId and/or utilizes OIDC/SSO for logging in users. In this scenario, the application is an application to assist IT support engineers with troubleshooting. The widget backend may be a language model proxy service which allows for unified access to several LLM providers over a uniform, abstracted API. The widget may be a packaged UI component (e.g., Javascript) including an AI/LLM Chatbot and published to npm. The user in this scenario may be a user utilizing a single-sign-on service User (e.g., any user with an assigned ID, like "Marco"). The access token may be an access token resulting from user authentication (e.g., OIDC). The first level of authorization in this scenario may be to ensure that the user "Marco" is authorized to use the application service. The second level of authorization may be to ensure that the packaged UI component (e.g., widget) is ok (e.g., authorized) to be used with the application.

In an example scenario involving set top box (STB) utilization across several television providers, a user may access a television service using a set top box. The set top box may be a "multi provider" in that it could be used with different providers (e.g., Vodafone, Swisscom, etc.), but the use with a specific provider requires explicit authorization. For example, the STB may be authorized to be used with Swisscom and Vodafone, but not with Orange, despite it being technically feasible to use the STB with Orange. One may need to ensure that only the correct user is accessing the television service, and that the user does so by utilizing an authorized STB, despite the fact that the STB might be used with different providers. In this scenario, the application may be a television service, the widget backend an STB streaming service running in the cloud, the widget an STB (e.g., that can be used with different TV providers, see above), the user any user with an assigned (e.g., like "Marco"), and/or the access token as the service provider credentials of Marco. Here, the first level of authorization may be to ensure that Marco has an active subscription for the television service. The second level of authorization may be utilized to ensure that the STB is ok (e.g., authorized) to be used with the television service. If Marco switches the STB for some third-party STB, then access to the service will be denied. If Marco tries to use his STB with another television service, that service will be denied-even if he has a subscription with that service, because the other television service has not yet authorized his STB.

In an example scenario involving Kubernetes (K8s) operator for different SaaS providers, consider a Kubernetes (K8s) application that uses a cloud hosted SQL database service. The K8s application may access the service via a "K8s SQL operator," which may be a multi-purpose operator and can interface with several SQL databases. In this scenario, access of the application to the SQL DB service may be controlled, as well as ensuring that the K8s SQL operator is only used with a specific set of SQL DB SaaS services. As such, in this scenario the application may be managed database service application (e.g., AWS SQL, Google SQL, Azure SQL, etc.) the widget backend a K8s SQL service in the control plane, the widget a K8s SQL operator, the user any K8s application that interacts with the database to perform its function, and/or the access token as the credentials of the application used to access the database.

An example scenario involving Function as a Service (FaaS) for different Saas providers may be similar to that of the K8s operator scenario outlined above. Here, a Function as a Service (e.g., AWS lambda) could be used in a similar scenario. For example, an AWS SQL lambda function may used to access a SQL DB. The AQS SQL lambda function may be multi-purpose and/or may be used to connect to a variety of backend SQL databases. In this scenario, access of an App to the SQL database service may be controlled, as well as ensuring that the AWS SQL lambda is only used with a specific set of SQL databases. As such, in this scenario the application may be managed database service application (e.g., AWS SQL, Google SQL, Azure SQL, etc.) the widget backend a particular service in the control plane (e.g., AWS service), the widget an SQL FaaS (e.g., AWS SQL lambda function), the user any application that interacts with the database to perform its function, and/or the access token as the credentials of the application used to access the database.

Figure 9:
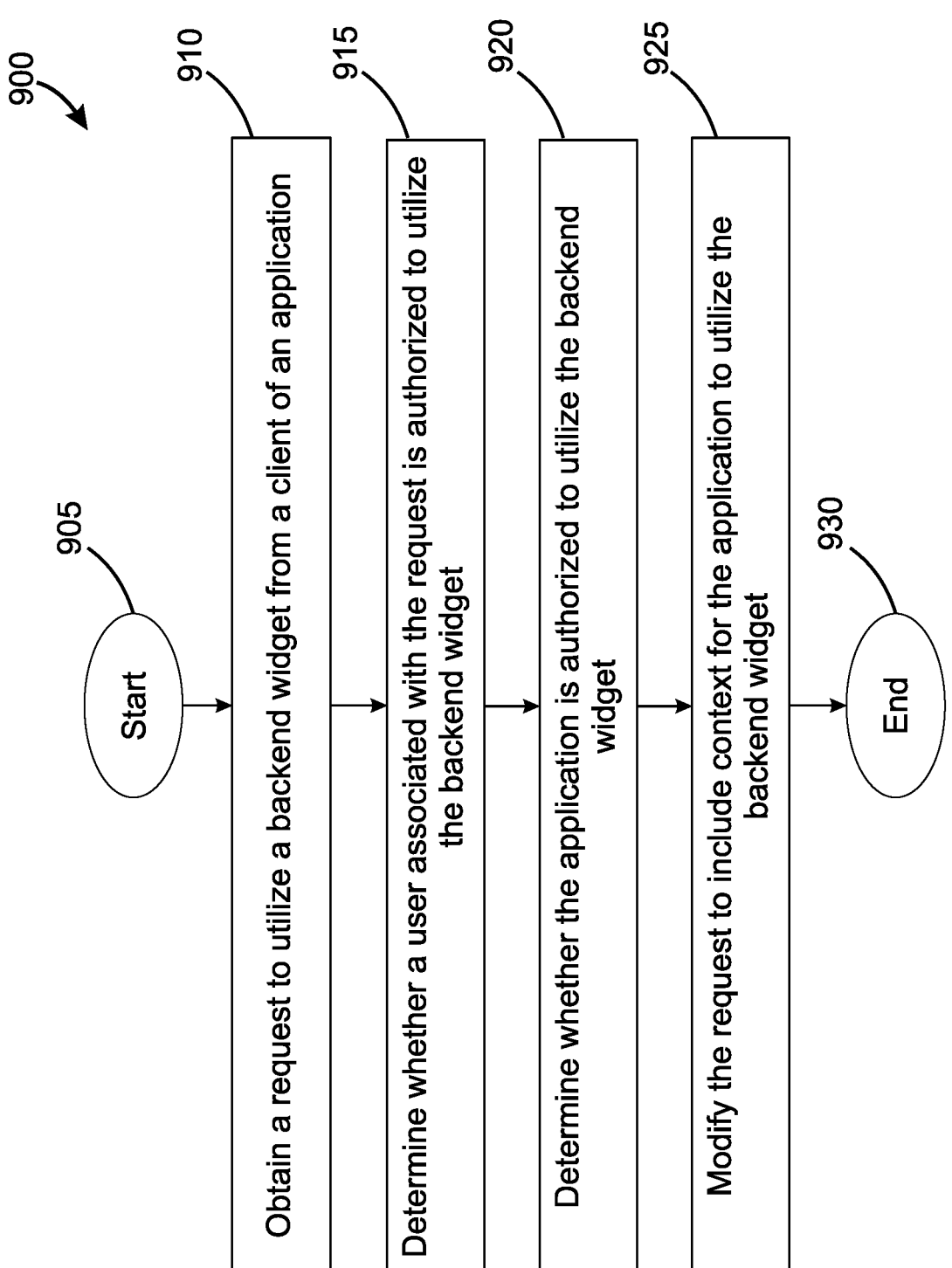
FIG. 9 illustrates an example of a simplified procedure for selective authorization control in multi-tenant applications, in accordance with one or more implementations described herein.

FIG. 9 illustrates an example of a simplified procedure for selective authorization control in multi-tenant applications, in accordance with one or more implementations described herein. For example, a non-generic, specifically configured device (e.g., device 200), may perform procedure 900 (e.g., a method) by executing stored instructions (e.g., authorization process 248). The procedure 900 may start at step 905, and continues to step 910, where, as described in greater detail above, the device (e.g., a controller, processor, etc.) may obtain a request from a client of an application to utilize a backend widget.

At step 915, as detailed above, the device may determine, based on an identifier of the application and a token associated with the request, whether a user associated with the request is authorized to utilize the backend widget. The token may be issued to the application from an authorization provider based on a determination that a session of the user for the identifier of the application is authorized. The identifier of the client component may be generated for the application in response to an authorization of a request to embed the client component in the application. Then, the identifier of the client component may be provided to the application where it can be used for various selective authorization control operations.

Determining whether the user is authorized to utilize the backend widget may include utilizing the authorization provider to determine whether a pairing of the token and the identifier of the application is valid.

At step 920, the device may determine, based on the identifier of the application and an identifier of the client component associated with the request, whether the application is authorized to utilize the backend widget. Determining whether the application is authorized to utilize the backend widget may include checking that the identifier of the client component exists in a backend client component identifier repository.

Further, the identifier of the client component and the identifier of the application may be stored associated with one another in a backend client component identifier repository. Then, determining whether the application is authorized to utilize the backend widget may include checking that the identifier of the application matches an application identifier associated with the identifier of the client component stored in the backend client component identifier repository.

At step 925, as detailed above, the device may modify, responsive to a determination that the user and the application are authorized to utilize the backend widget, the request to include context for the application to utilize the backend widget. The context may include one or more of: an identifier of a tenant included with the request or properties included with the request.

The backend widget may then be invoked to provide a response to the request. That response may be provided to the application (e.g., as a prompt answer, etc.). In various implementations, management operations on the backend widget may be performed based on administrative requests specifying the identifier of the client component.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce a generalized helper function (e.g., widget) that can be used by different applications. Based on pre-authorization (e.g., following a business relationship), the helper function may be authorized for use only with a specific set of applications, instead of being used generically with all applications where it would be technically possible. Owners can decide whether a helper function is authorized to be used within a specific application and, in case of multi-tenant applications, which tenant to be used.

As such, the techniques described herein introduced a more robust and flexible solution that can dynamically manage tenant contexts and ensure secure, context-aware widget operations across multi-tenant environments. These techniques enhance multi-tenant application management by providing granular authorization control, ensuring operations are performed within the correct tenant context, and/or allowing administrators to manage widgets post creation efficiently. The techniques support seamless integration and scalability across multiple applications and tenants while maintaining security and data isolation. These techniques also enhance auditability and compliance with regulatory requirements by tracking widget related activities. Consequently, these techniques may prevent unauthorized access to widgets, maintain data privacy, and/or enable efficient updates and customizations for tenant-specific configurations.

While there have been shown and described illustrative implementations that provide for selective authorization control in multi-tenant applications, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:
   obtaining, by a device, a request from a widget client of an application to utilize a backend widget, wherein the widget client is integrated with the application;
   determining, by the device and based on an identifier of the application and a token associated with the request, whether a user associated with the request is authorized to utilize the backend widget;
   determining, by the device and based on the identifier of the application and an identifier of the widget client, whether the application is authorized to utilize the backend widget; and
   modifying, by the device and responsive to a determination that the user and the application are authorized to utilize the backend widget, the request to include context for the application to utilize the backend widget.

2. The method as in claim 1, wherein the token is issued to the application from an authorization provider based on a determination that a session of the user for the identifier of the application is authorized.

3. The method as in claim 2, wherein determining whether the user is authorized to utilize the backend widget includes utilizing the authorization provider to determine whether a pairing of the token and the identifier of the application is valid.

4. The method as in claim 1, wherein determining whether the application is authorized to utilize the backend widget includes checking that the identifier of the widget client exists in a backend client identifier repository.

5. The method as in claim 4, wherein determining whether the application is authorized to utilize the backend widget includes checking that the identifier of the application matches an application identifier associated with the identifier of the widget client stored in the backend client identifier repository.

6. The method as in claim 1, further comprising:
   generating the identifier of the widget client for the application in response to an authorization of a request to embed the widget client in the application; and
   providing the identifier of the widget client to the application.

7. The method as in claim 6, further comprising:
   causing the identifier of the widget client and the identifier of the application to be stored in association in a backend client identifier repository.

8. The method as in claim 6, further comprising:
   performing management operations on the backend widget based on administrative requests specifying the identifier of the widget client.

9. The method as in claim 1, wherein the context includes one or more of an identifier of a tenant included with the request or properties included with the request.

10. The method as in claim 1, further comprising:
    invoking the backend widget to provide a response to the request; and
    providing the response to the application.

11. An apparatus, comprising:
    one or more network interfaces;
    a processor coupled to the one or more network interfaces and configured to execute one or more processes; and
    a memory configured to store a process that is executable by the processor, the process when executed configured to:
       obtain a request from a widget client of an application to utilize a backend widget, wherein the widget client is integrated with the application;
       determine, based on an identifier of the application and a token associated with the request, whether a user associated with the request is authorized to utilize the backend widget;
       determine, based on the identifier of the application and an identifier of the widget client associated with the request, whether the application is authorized to utilize the backend widget; and
       modify, responsive to a determination that the user and the application are authorized to utilize the backend widget, the request to include context for the application to utilize the backend widget.

12. The apparatus as in claim 11, wherein the token is issued to the application from an authorization provider based on a determination that a session of the user for the identifier of the application is authorized.

13. The apparatus as in claim 12, the process when executed further configured to:

determine, by the authorization provider, whether a pairing of the token and the identifier of the application is valid to determine whether the user is authorized to utilize the backend widget.

14. The apparatus as in claim 11, the process when executed further configured to:

determine whether the identifier of the widget client exists in a backend client identifier repository to determine whether the application is authorized to utilize the backend widget.

15. The apparatus as in claim 14, the process when executed further configured to:

determine whether the identifier of the application matches an application identifier associated with the identifier of the widget client stored in the backend client identifier repository to determine whether the application is authorized to utilize the backend widget.

16. The apparatus as in claim 11, the process when executed further configured to:

generate the identifier of the widget client for the application in response to an authorization of a request to embed the widget client in the application; and provide the identifier of the widget client to the application.

17. The apparatus as in claim 16, the process when executed further configured to:

cause the identifier of the widget client and the identifier of the application to be stored in association in a backend client identifier repository.

18. The apparatus as in claim 16, the process when executed further configured to:

perform management operations on the backend widget based on administrative requests specifying the identifier of the widget client.

19. The apparatus as in claim 11, wherein the context includes one or more of: an identifier of a tenant included with the request or properties included with the request.

20. A tangible, non-transitory, computer-readable medium storing program instructions that cause a device to execute a process comprising:

obtaining a request from a widget client of an application to utilize a backend widget, wherein the widget client is integrated with the application;

determining, based on an identifier of the application and a token associated with the request, whether a user associated with the request is authorized to utilize the backend widget;

determining, based on the identifier of the application and an identifier of the widget client associated with the request, whether the application is authorized to utilize the backend widget; and modifying, responsive to a determination that the user and the application are authorized to utilize the backend widget, the request to include context for the application to utilize the backend widget.

* * * * *